(12) United States Patent
Aimonen et al.

(10) Patent No.: US 9,990,874 B2
(45) Date of Patent: Jun. 5, 2018

(54) METHOD, APPARATUS AND COMPUTER PROGRAM PRODUCT FOR TESTING VIDEO PLAYBACK QUALITY

(71) Applicant: OptoFidelity Oy, Tampere (FI)

(72) Inventors: Petteri Aimonen, Jyväskylä (FI); Kimmo Jokinen, Tampere (FI); Kalle Ryynänen, Tampere (FI)

(73) Assignee: OptoFidelity Oy, Tampere (FI)

( * ) Notice: Subject to any disclaimer, the term of this patent is extended or adjusted under 35 U.S.C. 154(b) by 246 days.

(21) Appl. No.: 14/888,763

(22) PCT Filed: May 2, 2014

(86) PCT No.: PCT/FI2014/050324
§ 371 (c)(1),
(2) Date: Nov. 3, 2015

(87) PCT Pub. No.: WO2014/177773
PCT Pub. Date: Nov. 6, 2014

(65) Prior Publication Data
US 2016/0078793 A1    Mar. 17, 2016

(30) Foreign Application Priority Data

May 3, 2013    (FI) ...................................... 20135460

(51) Int. Cl.
*G09G 3/00*    (2006.01)
*G09G 5/02*    (2006.01)
(Continued)

(52) U.S. Cl.
CPC ............... *G09G 3/006* (2013.01); *G06T 7/90* (2017.01); *G09G 5/02* (2013.01); *G09G 3/3406* (2013.01);
(Continued)

(58) Field of Classification Search
CPC ........ G09G 3/006; G09G 3/3406; G09G 5/02; G09G 2310/08; H04N 17/04; H04N 17/004
See application file for complete search history.

(56) References Cited

U.S. PATENT DOCUMENTS 5,572,444 A    11/1996    Lentz et al.
7,519,507 B1    4/2009    Herz
(Continued)

FOREIGN PATENT DOCUMENTS

EP    0888019 A1    12/1998
WO    2006024698 A1    3/2006

OTHER PUBLICATIONS

Extended European Search Report, Application No. 14792242.1-1904/2992525 PCT/FI2014/050324, dated Dec. 23, 2016, 11 pages.
(Continued)

*Primary Examiner* — Antonio A Caschera
(74) *Attorney, Agent, or Firm* — Ziegler IP Law Group, LLC (57) ABSTRACT

A method for testing a display includes capturing information displayed by the display at a location of an identifier displayed with a frame of a sequence of frames; and analysing the captured information. The method further includes determining a colour of the identifier; and using information on the determined colour to determine at least one of the following: a change of a frame in the sequence of frames displayed by the display; a timestamp of a frame in the sequence of frames displayed by the display; a frame of the sequence of frames not displayed by the display. An apparatus for implementing the method is also included.

20 Claims, 7 Drawing Sheets

(51) Int. Cl.
   *G06T 7/90* (2017.01)
   *G09G 3/34* (2006.01)
   *G09G 5/14* (2006.01)

(52) U.S. Cl.
   CPC ........... *G09G 5/14* (2013.01); *G09G 2310/08* (2013.01); *G09G 2340/10* (2013.01)

(56) References Cited

U.S. PATENT DOCUMENTS

| | | | |
|---|---|---|---|
| 2003/0058202 A1* | 3/2003 | Evanicky | ............... G09G 3/006 345/82 |
| 2006/0180656 A1 | 8/2006 | Ferraro | |
| 2008/0137968 A1 | 6/2008 | Joung et al. | |
| 2010/0157047 A1 | 6/2010 | Larkin et al. | |
| 2012/0044359 A1 | 2/2012 | Voltz | |
| 2012/0127324 A1 | 5/2012 | Dickins et al. | |
| 2014/0233648 A1* | 8/2014 | Kumar | .................. H04N 19/89 375/240.16 |

OTHER PUBLICATIONS

Written Opinion of the International Searching Authority for PCT/FI2014/050324 dated Aug. 14, 2014 (7 pages).

* cited by examiner

METHOD, APPARATUS AND COMPUTER PROGRAM PRODUCT FOR TESTING VIDEO PLAYBACK QUALITY

FIELD OF THE INVENTION

The present invention relates to a method for testing a display, the method comprising providing an identifier at a certain location for each frame of a sequence of frames; displaying the sequence of frames on the display; capturing information displayed at the location of the identifier; and analysing the captured information. The invention also relates to an apparatus for testing a display, the apparatus comprising means for capturing information displayed at a location of the display, and means for analysing the captured information. The invention further relates to computer program product for testing a display including one or more sequences of one or more instructions which, when executed by one or more processors, cause an apparatus or a system to at least capture information displayed by the display at a location of an identifier displayed with a frame of a sequence of frames; and analyse the captured information.

BACKGROUND OF THE INVENTION

Apparatuses and methods have been developed for testing devices having a display without opening the device or connecting any measuring equipment to the device. Such apparatuses may capture images of the display with an image sensor. Captured image information is then analysed to determine the quality of video playback. In some methods a certain area of the display is used to display a frame indicator. The frame indicator is for example a square which is shown as a white square by every other frame and as a black square by every other frame. Hence, the area can be imaged at intervals wherein the frame rate can be detected on the basis of the frequency of the varying black and white squares. However, it may happen that the display may not show each consecutive frame i.e. one or more frames may be dropped. This means that two consecutive frames which are shown by the display (and the dropped frame in between) may not be recognized as different frames because the square has the same colour in both of these frames. As a conclusion, the apparatus may interpret these two frames as one single frame, which causes erroneous test results. In some cases, the frame indicator may be a number, binary ID or even a rotating symbol. Problem with these larger indicators is that they consume the display space which should be reserved for the display content. They also require quite complex hardware for reading and analysing the frame information.

The document WO 2006/024698 discloses a method and apparatus for measuring the quality of a video transmission. To facilitate the measurement of the quality of a video transmission, a bar code is embedded in the top part of the frames of the transmitted video signal to enable identification of each frame. The audio signal may be synchronised with the different bar codes. The bar code may be formed of several blocks in the top of the image, and may be formed of superimposed binary bar codes, each binary bar code being in one colour of a colour system. This permits measurement of transmission quality, and notably of dropped frames, audio holes, transmission delay, audio and video synchronisation. The bar code can be added to a video signal to be transmitted e.g. by using a board comprising different light sources and capturing the lights by a camera, or they may be otherwise embedded in the video. A received video transmission can be examined by using an AV board, which uses the vertical and horizontal synchronisation signals to select the video lines where the bar code should be sampled. This kind of arrangement requires a separate board which should be connected to signal wiring before the display. Furthermore, this system is not able to test properties of the display because the measurement is performed before the video is provided to the display and the measurement is not based on information shown on the display Therefore, there is a need to find an improved method and apparatus in which successive frames and possibly dropped frames may be more reliably detected by the apparatus. The method should also enable the use of very simple test setup.

In this context the term frame is one set of visual information in matrix form to be shown by a display. The frame may be a part of a video content i.e. one image of a sequence of images, a picture, etc. The term dropped frame or an omitted frame means a frame of a sequence of frames which is not displayed by the display although the frame is provided to the display. The reason for dropping the frame may be, for example, that the display is not fast enough, an input buffer of the display is full, the device controlling the display is occupied by other simultaneous tasks etc.

SUMMARY OF THE INVENTION

One aim of the present invention is to provide an improved method and apparatus for change of frame and dropped frame detection during testing of a display. Testing of a display means in this context e.g. testing the performance of a video playback or the performance of a game. In some embodiments a colour sensor is used to capture images shown by a display and to analyse colours shown at a certain area of the display. In other words, data from a colour sensor is processed and change of frames is detected by means of monitoring the colour changes at the certain area. To put it more precisely, the method of the present invention is primarily characterised by:
  detecting the colour of the identifier; and
  using information on the detected colour to determine at
    least one of the following:
  a change of a frame in the sequence of frames displayed
    by the display;
  a timestamp of a frame in the sequence of frames displayed by the display;
  a frame of the sequence of frames not displayed by the
    display.

The apparatus of the present invention is primarily characterised in that the apparatus further comprises:
  means for determining a colour of the identifier; and
  means for using information on the detected colour to
    determine at least one of the following:
  a change of a frame in the sequence of frames displayed
    by the display;
  a timestamp of a frame in the sequence of frames displayed by the display;
  a frame of the sequence of frames not displayed by the
    display.

The computer program product of the present invention is primarily characterised in that said at least one memory stored with code thereon, which when executed by said at least one processor, further causes the apparatus or system at least to perform:
  determine a colour of the identifier; and
  use information on the determined colour to determine at
    least one of the following:

a change of a frame in the sequence of frames displayed by the display;

a timestamp of a frame in the sequence of frames displayed by the display;

a frame of the sequence of frames not displayed by the display.

Some advantageous embodiments are defined in the dependent claims.

Some advantages may be achieved by the present invention. Changes of frames and possibly dropped frames may be detected more easily than in prior art methods. Possible effects of backlights used in the displays may also be eliminated or reduced so that more reliable detection may be achieved and the testing be independent on backlight brightness settings, for example. Measurements may be directly obtained from the display without a need to connect cables to the display. Objective test results as the end-user would see it can be obtained. The measurement setup may also be fixed so that the tests are repeatable and reliable. Many kinds of typical display technologies may be tested by utilizing the present invention and it is also possible to compare different displays, devices and technologies. Reliable detection of dropped frames may also be obtained by the present invention.

The testing method and apparatus of the present invention may be integrated to an existing testing environment.

DESCRIPTION OF THE DRAWINGS

In the following the present invention will be described in more detail with reference to the appended drawings, in which.

DETAILED DESCRIPTION OF THE INVENTION

Figure 1:
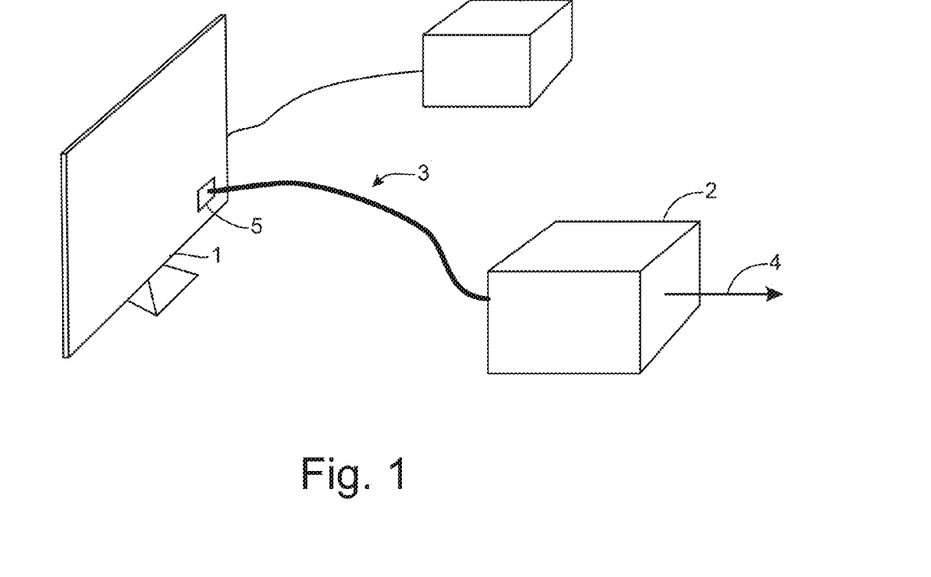
FIG. 1 is a conceptual drawing of a measurement setup according to an example embodiment.
Figure 14:
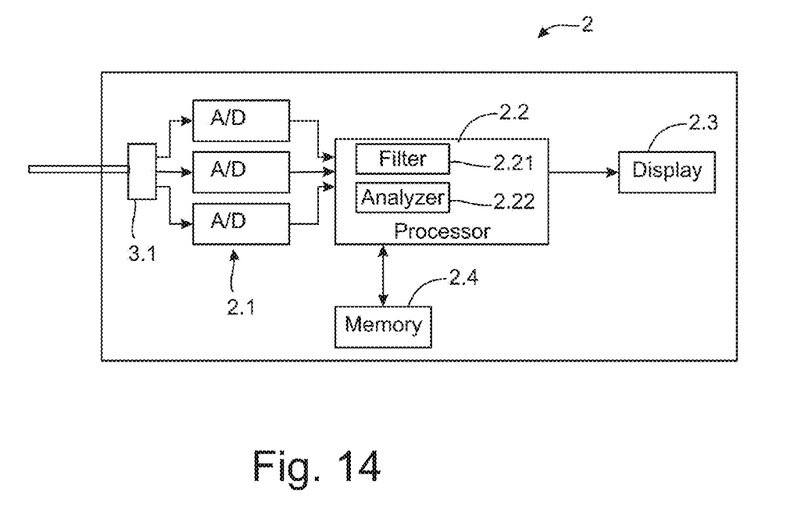
FIG. 14 is a simplified block diagram of an apparatus according to an example embodiment of the present invention.

In the following some example embodiments will be described. FIG. 1 illustrates an example of a measurement setup according to an example embodiment and FIG. 14 is a simplified block diagram of an apparatus 2 according to an example embodiment of the present invention. The setup comprises a display 1 to be tested and the testing apparatus 2. The testing apparatus 2 comprises a sensor 3 by which information of a part of the display may be captured for analyses. The apparatus 2 may provide 4 some information of the display to further processing, if needed. Different frames may be shown by the display 1. The frames may be part of a video content, game content, individual images and/or other visual information. In addition to the content, an identifier 5 is also shown with each frame. The identifier 5 may also be called as a marker. The identifier 5 is visually different in consecutive frames, wherein a change of a frame may be detected by examining if the visual properties of the identifier have been changed. In some embodiments the differing visual properties include the colour of the identifier wherein the colour of the identifier is different in each two consecutive frames. In many embodiments there is a certain sequence of different colours which will have the repetition rate equal to the length of the sequence. For example, in some embodiments the sequence comprises five different colours wherein the identifier of five successive frames have different colour and the sequence repeats itself after five frames. In some other embodiments the length of the sequence may be different from five. In each case, the length of the sequence is at least three to enable to detect at least one dropped frame. Some marker colours may be reserved for special use, a non-limiting example could be audio/video synchronization, "lip-sync" measurement purposes.

In some situations more than one frame may be dropped wherein to be able to detect N dropped frames the length of the sequence should be at least N+2. However, in some situations it may be possible to use some additional techniques to determine a time period within which a change of frame should occur. In such situations it may be possible to use shorter colour sequences than N+2.

The sequence of frames which are to be shown by the display may be specifically prepared for the testing wherein the frames may already be provided by the identifier, or the sequence of frames may be added with the identifiers when the sequence of frames is provided to the display. For example, there may be a separate apparatus 6 which inserts the identifiers to each frame or the testing apparatus 2 may include such functionality.

The sensor 3 may be an optical sensor by which the colour information of the identifier may be optically provided from the display via an optical fibre to an opto-electrical converter 3.1 which converts the optical information into electric signals. The opto-electrical converter may comprise three or more individual converters wherein each converter has a certain wavelength range in which the converter has the highest sensitivity. Each converter thus has a different wavelength range so that the combination of the converters is able to produce signals in relation to the intensity of e.g. red, green and blue lights.

In an example embodiment, each of the opto-electrical converters 3.1 of the sensor 3 produces an output which is relative to the strength of illumination within the wavelength range of the opto-electrical converter. For example, a first opto-electrical converter of the sensor 3 produces an output voltage which is the higher the stronger is the red component of the colour of the identifier, a second opto-electrical converter of the sensor 3 produces an output voltage which is the higher the stronger is the green component of the colour of the identifier, and a third opto-electrical converter of the sensor 3 produces an output voltage which is the higher the stronger is the blue component of the colour of the identifier, wherein the combination of the outputted voltage values may be used to determine the colour of the identifier. However, it is not always such a straightforward task to use the output(s) of the sensor 3 to determine the colour of the identifier but some kind of conversion from one colour space to another colour space may be needed, as will be shown later in this disclosure.

In some embodiments the sensor 3 does not comprise the fibre wherein the opto-electrical converter may be arranged at one end of a flexible cable from which there is provided wiring for leading electric signals from the opto-electrical converter to the apparatus 2. Hence, during operation of the apparatus 2 the opto-electrical converter may be put near the surface of the display 1 at the location where the identifier is displayed so that the opto-electric converter receives illumination produced by the display 1.

Then signals produced by the sensor may be sampled to form digital representation (sampling data, block 20 in FIG. 2) of the signals and the sampling data is analysed over time to detect possible colour transitions. These transitions may be filtered 26 to produce ideally one transition per frame. Advantageously, the colour information for a current frame is collected right before the next colour transition in order to give maximum time for the display 1 to change its colour. The colour information in the transitions is decoded to yield the frame times and dropped frame count. The frame times are computed as the time passed since the previous change, while dropped frames are detected by missing colours in the colour sequence.

Detecting frame rate and dropped frames may be performed e.g. as follows. When the colour of the identifier has been determined, the apparatus 2 may examine if the colour has changed from a previous examination and if so, the apparatus 2 may determine that there has been a change of frame between these two examinations. Then, the apparatus 2 may examine whether the colour of the latest detected frame corresponds with an expected colour or not. The expected colour can be determined on the basis of the predetermined colour sequence. In other words, in the predetermined colour sequence certain colours are repeated in a predetermined order. If the colours of the identifiers follow this predetermined order it may be assumed that all frames have been properly presented by the display. However, if the colour(s) of one or more identifiers do not correspond with the predetermined sequence, it may be deduced that one or more frames have not been properly (or not at all) shown by the display.

Let us now describe some non-limiting examples of the sequence of colours of the identifier. According to one example the sequence is the following: red-green-blue-red-green-blue- . . . . It can now be deduced that if, for example, the third frame in the first example sequence is dropped by the display, the apparatus may detect the following sequence of colours of the identifier: red-green-red-green-blue- . . . . After determining the colour of the third identifier the apparatus compares the determined colour (red in this example) with the expected colour. The previous properly identified colour in this example is green, wherein the apparatus expects to detect an identifier having blue colour. However, this differs from the detected colour red, wherein the apparatus can determine that one frame have been dropped. If we now assume that two consecutive frames have been dropped, the sequence of colours of the actually detected frames could be red-green-green-blue, wherein the apparatus may not detect a change of frame because the colour of the identifier of two successive frames are the same (green in this example). Another example sequence of colours is blue-green-magenta-yellow-red-cyan-blue-green-magenta- . . . . If this sequence were used and two successive frames were dropped, the apparatus could detect e.g. the following sequence of colours: blue-green-red-cyan-blue-green-magenta- . . . . Now, the third and the fourth frames were assumed to be dropped, wherein the apparatus detects that the identifier of the third detected frame is red. By examining the colours of the previously detected frame (i.e. green in this example) and the latest detected frame (i.e. red) and comparing that with the expected sequence of colours (i.e. blue-green-magenta-yellow-red-cyan) the apparatus could determine that the third and fourth frame were dropped. The second example comprises six different colours wherein at most four successive missing (dropped) frames could be detected by the apparatus.

In some embodiments the sequence of colours of the identifier may be such that one colour is repeated in every other frame and two or more other colours are alternating in every other frame. As a non-limiting example of such a sequence is the following: red-green-red-blue-red-green-red-blue- . . . . Another non-limiting example is blue-green-blue-magenta-blue-yellow-blue-red-blue-cyan-blue-green-blue-magenta- . . . . However, with such sequences the apparatus may not be able to detect if one frame has been dropped if the dropped frame has the colour which is not repeated in every other frame. To clarify this, we could use the first example sequence and assume that e.g. a frame having green or blue identifier is dropped. Then, the apparatus received two successive frames in which the colour of the identifier is the same (i.e. red in this example).

The above description provided an overview how the identifier may be used to detect frame changes and/or dropped frames. In the following, more details are provided how colour transitions may be detected and effects of possible disturbances of a backlight of the display may be eliminated or reduced.

Properties of displays 1 may vary wherein some kind of compensation may be needed. For example, different displays may have different colour reproduction properties which may affect to the determination of the colour of the identifier. Also the brightness of the backlight and the method how the backlight is controlled may affect to the detection of colour transitions.

Historically, one backlight technology for liquid crystal displays (LCD) has been the use of cold-cathode fluorescent lights. Some newer displays and especially mobile devices use light emitting diode (LED) based backlights to reduce power consumption of the device. With both of these technologies, the brightness is adjusted using pulse width modulation to turn the backlight on and off in a fast pace. The difference is that the fluorescent backlights take more time to turn off, while for LEDs the transition is almost immediate. This switching is not visible to the human eye because of the high frequency. However, the sensor 3 could detect changes in the brightness of the display with higher precision than the human eye. Therefore the backlight modulation could interfere with the measurements and should be filtered out.

Figure 3:
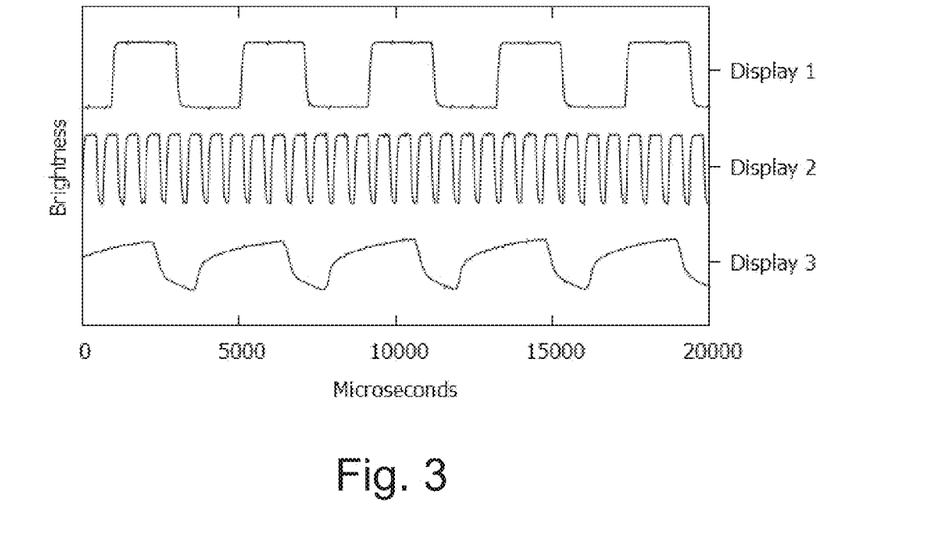
FIG. 3 illustrates behaviour of various kinds of display backlights.

With both types of backlights, the frequency used for the modulation varies widely. For example, the frequency may be in a range from 200 Hz to more than 2 kHz. Typically LED backlights use higher frequencies than fluorescent backlights, but there are exceptions to this rule. FIG. 3 shows examples of data captured of 3 different displays.

Displays 1 and 2 (a mobile device and a laptop) use a LED backlight. Display 3 (a desktop monitor) uses a fluorescent backlight.

Furthermore, the change between consecutive colours is not immediate. On many displays the change can take several milliseconds and is not usually linear. Therefore a robust method of detecting the colour transitions may be needed.

Still further, the colour space that is presentable on a display screen varies between different display technologies. The human brain is able to quickly adapt into various colour balances, but for an electronic sensor the yellow on one display can be radically different from the yellow on another display. Therefore a calibration method may be needed.

Figure 2:
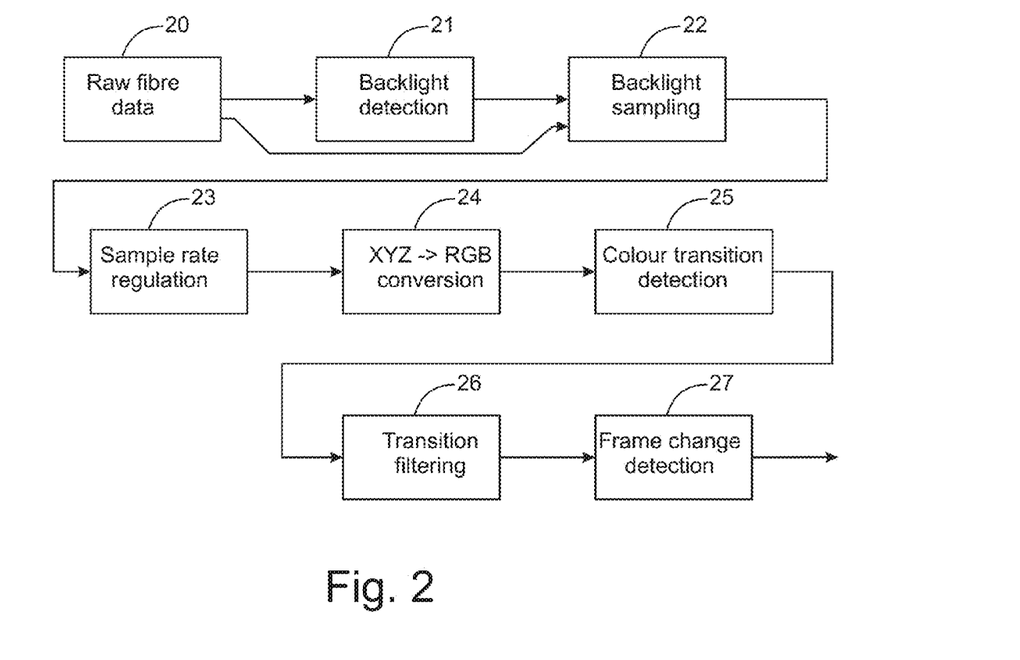
FIG. 2 depicts an example of a signal processing pipeline for frame rate measurement.
Figure 5:
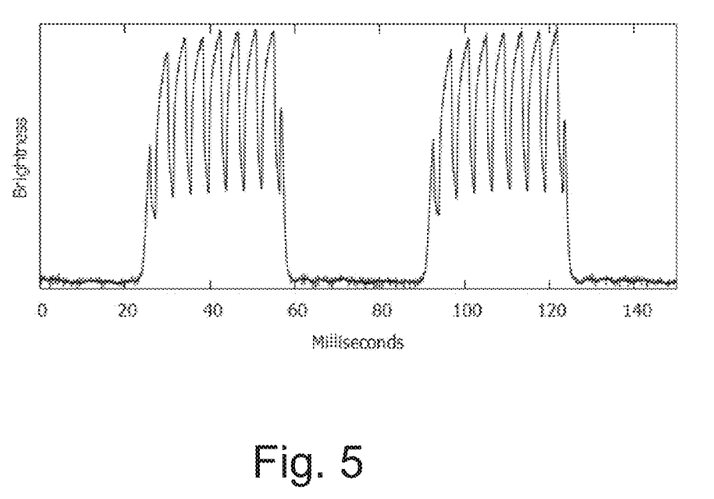
FIG. 5 illustrates detection of backlight illumination periods with black and white marker.

In the following an example embodiment of backlight illumination period detection 21 is provided. The backlight illumination period means the time the backlight is switched on. The backlight illumination period may usually be periodically repeated as is illustrated in FIG. 5. The signals provided by the sensor 3 is captured by the apparatus 2 at a first sample rate, e.g. 100 kHz. The apparatus 2 may comprise an A/D converter 2.1 for each signal i.e. for different colours to take samples of the signals. In this example the sensor 3 provides three different signals wherein three A/D converters 2.1 may be needed or the same A/D converter may be used to successively take samples of the three signals. In some embodiments the backlight period detection may be performed by using only one of the signals from the sensor 2.

Figure 4:
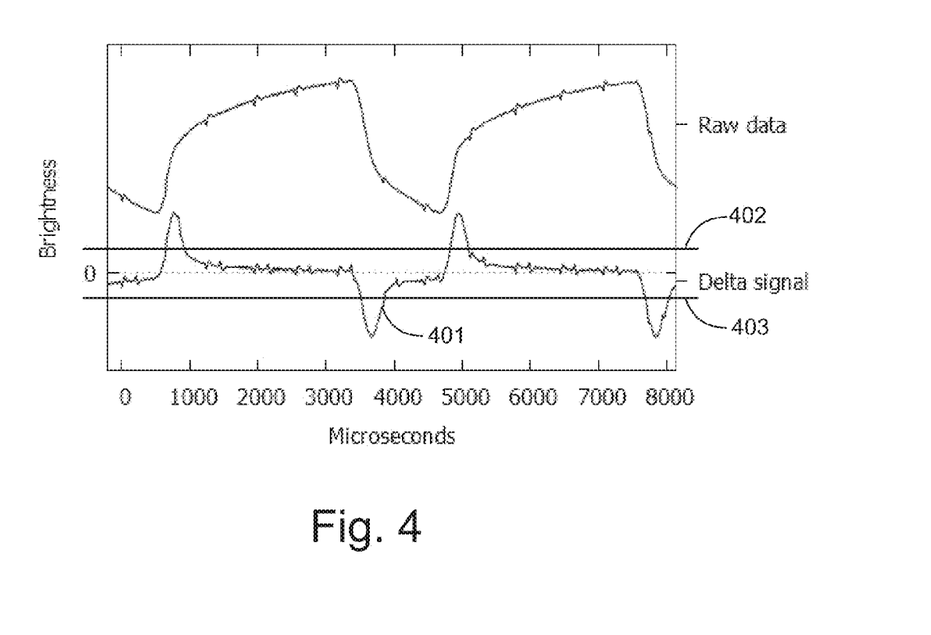
FIG. 4 shows some example results of calculating brightness delta over a sliding window.

The samples may be filtered by a filter 2.21 to detect rising and falling edges of the signal from the sensor. FIG. 4 illustrates an example of the signal 400 from the sensor 3 (raw data) and a delta signal 401 which has been formed on the basis of the sensor signal. The filtering may be, for example, a sliding window-based filtering in which a certain amount of samples are combined to form one filtered sample. The next filtered sample may then be formed by taking the same amount of samples beginning from one sample later than the previous filtering step and combining the values of the samples. The combining may be an average of the samples, a mean of the samples or another appropriate operation. In some embodiments the size of the window may be 20 samples wherein the first filtered sample is based on samples from 1 to 20, the second sample is based on samples from 2 to 21, etc. In FIG. 4 the delta signal 401 is calculated by using the sliding window-based filtering. If the first sampling rate is 100 kHz, 20 samples would mean 200 microseconds, but it is obvious that other sampling rates and/or sliding window lengths could be used as well.

The apparatus 2 may examine the filtered samples to detect rising and falling edges. The detection may comprise comparing each filtered sample with a first (lower) threshold and/or a second (higher) threshold. If the filtered sample is below the first threshold and the previous filtered sample was above the first threshold, the apparatus 2 may determine that there is a falling edge in the delta signal 401. If the filtered sample is above the second threshold and the previous filtered sample was below the second threshold, the apparatus 2 may determine that there is a rising edge in the delta signal 401. The line 402 in FIG. 4 illustrates the first threshold and the line 403 in FIG. 4 illustrates the second threshold. The difference between the first and second threshold should be larger than system noise to prevent false edge detections.

The apparatus 2 may determine that the backlight on-period begins when the rising edge is detected and, respectively, the backlight on-period ends when the rising edge is detected. By calculating the time between consecutive rising or falling edges, the backlight period can be obtained. By calculating the time from rising edge to the next falling edge, the backlight duty cycle (on-time) can be obtained.

In some situations the backlight period may not be detected wherein a constant sample rate (e.g. 1 kHz) may be used in a sampling stage.

Determining the backlight illumination period may also be called as backlight synchronization because one purpose of the determination of the backlight illumination period is to synchronize sampling of colour determination to the backlight illumination periods. When the sampling of colour determination is each time performed substantially at the same phase of the backlight period, the illumination conditions are substantially the same i.e. the brightness of the backlight is substantially the same at each sampling moment. This reduces or even totally eliminates possible effects of variations in the brightness of the backlight. One additional purpose for the backlight illumination measurement is synchronizing an external camera capture. This method would gain advantages in further signal processing of the camera images, because the variation in the brightness can be eliminated.

Because the content on the screen changes, the brightness may occasionally change in the middle of a backlight period. This may be detected as a period shorter than the real one. In order to filter out these spurious periods, the apparatus 2 may comprise a filter which keeps track of several previous periods. They are sorted by the length of the period, and the median item may also be used for phase and duty.

Plain median filter always provides a result, even if all the periods are random, i.e. there is only noise. Therefore the filter requires several consecutive periods before initially locking to a new frequency. Before enough periods have been detected, the filter reports a status of 'no backlight'.

The apparatus 2 may be able to track the backlight also over short black periods. These occur for example when using a black and white marker, like in FIG. 5. The black screen blocks the backlight, but for a short time the periods can be extrapolated.

Another need for the extrapolation arises from the fact that the previous stages only give information of the past periods. Therefore all outputs of the backlight synchronization filter are in fact extrapolated by at least one period.

In practice, the extrapolation may be performed until a given time limit is exceeded, for example 500 milliseconds. This is long enough to handle black frames, but short enough so that the error in the predicted backlight phase doesn't grow too large.

In practice, only LCD displays do backlight modulation in this way. When measuring other kinds of displays, the backlight synchronization might not be needed. Also in situations in which the LCD display brightness is set to a maximum, the backlight synchronization may not be needed.

When the backlight illumination period has been determined if necessary, signals from the sensor 3 may be resampled 22, 23 at a second sampling rate, for example 1 kHz, to obtain samples for determining the colour of the identifier. The second sampling rate may usually be lower than the first sampling rate. The sampled data from sensor 3 i.e. three different samples at each sampling moment may be used to convert 24 the colour information from XYZ colour space to a calibrated RGB colour space, or the original colour space may be used.

The original signal is advantageously sampled at the high points of the backlight. When the backlight phase is known, this may be performed by capturing the colour samples at the middle of the duty cycle.

Figure 6:
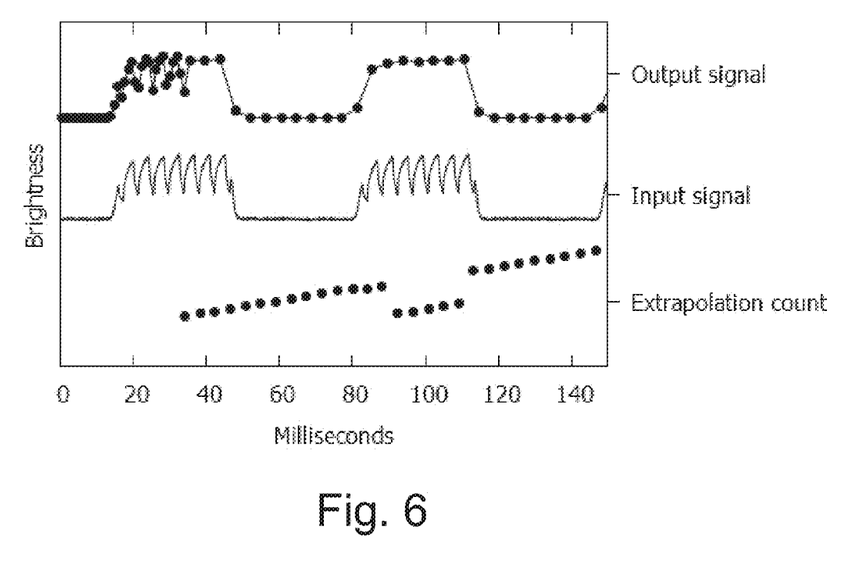
FIG. 6 illustrates an example of the operation of backlight extrapolation and sampling.

In the example case portrayed in FIG. 6, the backlight synchronizer locks in after four full periods. After this, the extrapolation count slowly rises with a few sharp steps, following the results of the median filtering. It is not a problem that the median filter often uses relatively old samples, as they will automatically be discarded when they leave the extrapolation window.

At the beginning of the graph, the output sampler is taking samples at the default 1 kHz rate as no backlight has yet been detected. This causes the backlight effects to get through into the sampled signal, as seen around the 20 ms mark. After the backlight synchronization locks in, the output signal is smooth.

The two most common display technologies in use today are LCD and OLED. The former is based on liquid crystals which reorient to either pass or block backlight. The latter is based on an array of diodes which themselves emit light when current passes through them.

The change of orientation in liquid crystals is essentially an electrochemical process. Therefore it has considerable delay before the crystals have had time to fully reorient themselves after voltage changes. In contrast, the diodes in OLED screen turn on and off practically instantly when the voltage over them changes. However, even OLEDs have a delay caused by the electrical control circuit that is used to drive them.

Figure 7:
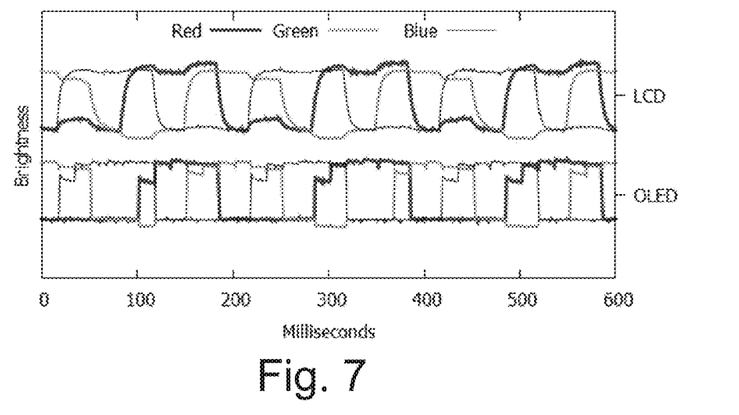
FIG. 7 depicts graphs of a red-yellow-green-cyan-blue-magenta sequence on LCD and OLED screens.

FIG. 7 depicts example graphs of red-yellow-green-cyan-blue-magenta sequence on LCD and OLED displays. Data has been projected to automatically calibrated RGB colour spaces for each display.

The graphs shown in FIG. 7 have been obtained from measuring the colour marker in a 30 FPS (frames per second) video playing on two displays. The sequence is recognizable both on LCD and OLED measurements, but the OLED graph has a stair case appearance, while LCD graph is smooth around the edges.

The LCD display takes considerable time to reach its final value. Therefore the colour values should be collected only after the display has had sufficient time to settle.

Even though the changes in the OLED graph are rapid, it does not immediately reach its final colour either. Instead, the colour changes on every display scan until the colour has fully changed. In this case the display scan happens at 60 Hz i.e. twice every frame. These display scans should not be confused with actual content changes.

Figure 8:
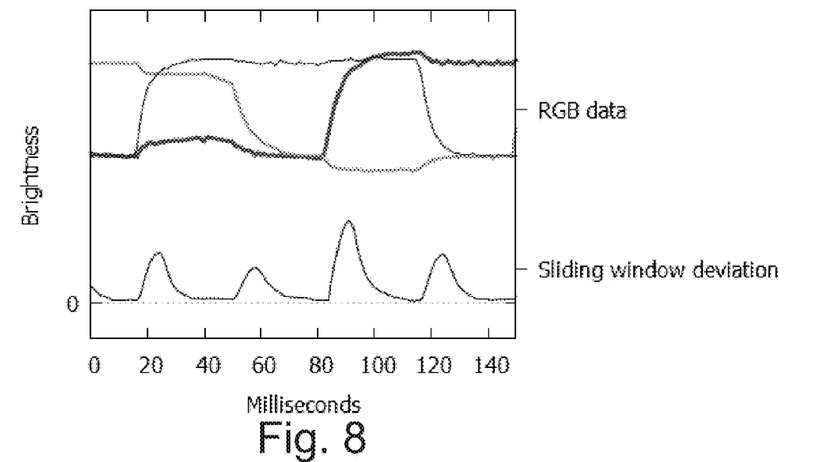
FIG. 8 depicts sliding window deviation computed from RGB data.

The points where the displayed colour changes may be detected using sliding window variance. The variance is computed for each colour channel separately and summed together. Then square root is taken to yield deviation, as shown in FIG. 8.

The frame changes could be detected using simple thresholding of the deviation values. However, this is sensitive to the background noise in the system which raises the floor of the deviation graph above the zero level. Instead, the deviation is further differenced over a sliding window, like done in the backlight detection. These differences are then compared to threshold to yield "start of change" and "end of change" moments.

One meaningful timestamp is the start of change. This is essentially the moment where display began to switch the frame, and it is used for computing the frame times. The colour values are sampled right before the next start of change or after a specified time has passed since the end of change.

Figure 9:
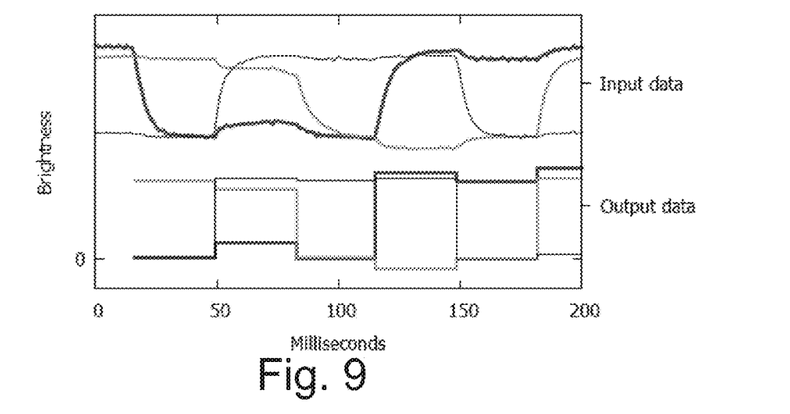
FIG. 9 illustrates an example of input and output waveforms of a transition detector.

The output of the colour transition detector block 25 consists of "ideal transitions", i.e. colour reaches the final value immediately. This is shown in FIG. 9 with LCD display used in the example. In this case, the output signal is already good, as there is exactly one change per every frame.

Even though the basic colour transition detector may be enough for most LCD displays, it can still emit unnecessary colour changes. This problem is most critical with OLED displays, where each of the display scans would be detected as a transition. In fact, from purely looking at the signal they do appear just like valid colour changes. In order to filter these out, the sequence of colour transitions could be examined. As can be seen in FIG. 7, the intermediate values are always somewhere midway between initial and final colour. This makes sense, as the colour has "halfway changed" on the first display scan. Thus the filtering algorithm may take the normalized vector differences of consecutive colour values and compute the dot product between the vectors. If this dot product is above a configured threshold, the two transitions are combined into one. The combination takes the timestamp of the first transition and colour values of the last transition. In a similar way, the changes are filtered 26 by the minimum change size and minimum time delta. The end result is a graph much like FIG. 9, but now more robust against various display effects.

Frame times could be obtained 27 by subtracting timestamps of two consecutive frame changes. However, to detect missing frames in the sequence, each individual colour should be recognized and compared to the expected value as was described above.

In the following there is a short disclosure of projection from XYZ colour space to RGB colour space.

The colour of a light source is not a scalar value. It is not a 3-component vector either, even though that is the most common way to process colour values on computers. Instead, the only fully accurate way to present a specific colour is to present its entire spectrum.

The human eye forms its perception of colours by means of three types of cone cells. These are roughly sensitive to "red", "green" and "blue" light, but this is just an approximation unless we adopt some arbitrary definition of what e.g. "red" means.

Figure 10:
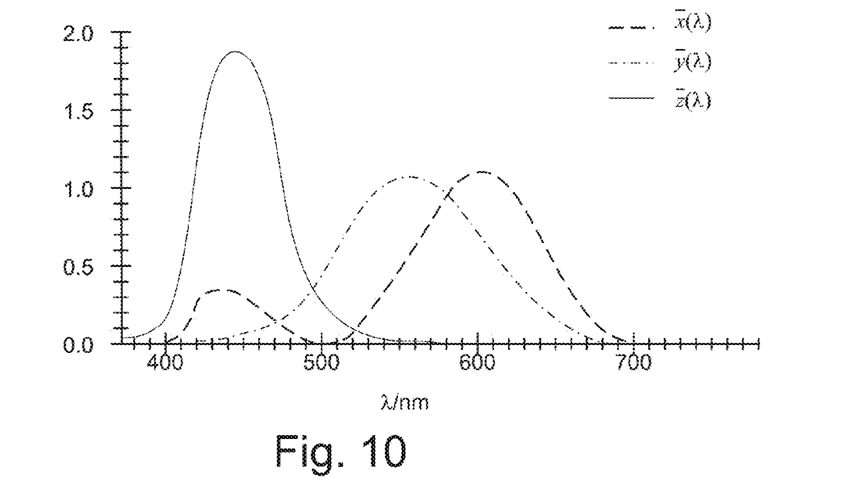
FIG. 10 illustrates sensitivities of human eye to various wavelengths of light.

The CIE1931 XYZ colour space has been designed to approximate the behaviour of human vision. It is based on the experimentally determined sensitivities of human eye to various wavelengths of light, as represented in FIG. 10. Many colour sensors use the XYZ colour space for measurements. Most computer controlled displays currently in use are based on the RGB colour space. Basically, they are composed of red, green and blue pixels which each emit a colour roughly equivalent to their name. In reality, each of these colours is composed of light of many different wavelengths. Consequently the way the colour is perceived by the eye and by the sensor 2 depends on the exact composition of the wavelengths that form it.

Figure 11:
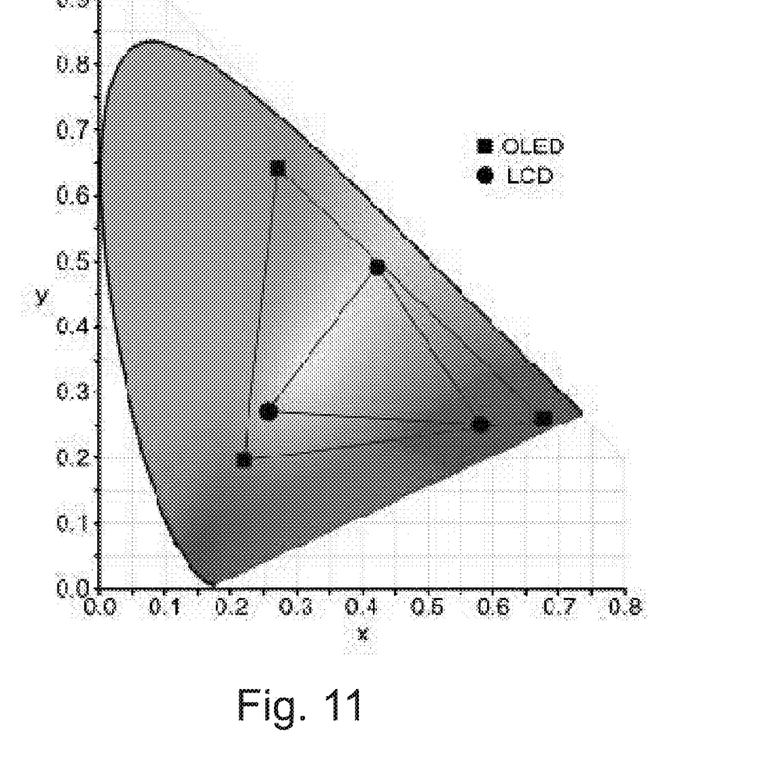
FIG. 11 illustrates an example plot of colour gamuts of OLED and LCD displays.

Problems may arise because the colour response of "red", "green" and "blue" on different displays are different. In FIG. 11, there is a plot of colour gamuts of OLED and LCD displays presented as a gray scale image of the CIE1931 xy chromaticity diagram. The corner points of the triangles correspond to red, green and blue colour as presented on the display. The orientations of the triangles are significantly different. The green colour on LCD display is closer to the yellow than to the green of the OLED screen. Consequently if a hardcoded XYZ→RGB transformation were used, one of these displays would always be mistreated. Human brains automatically compensate for the varying colour balances, but a computer needs special algorithm to accomplish that.

There is one thing that is common to most displays: they all form colours as a sum of lights. Therefore the XYZ values for the "yellow" colour will always be the sum of XYZ values for the "red" and "green" colours. If we can obtain the values for these red, green and blue colours, we can predict the value of any other colour. In fact, these colours will form the base vectors of the RGB colour space of the display.

Figure 12:
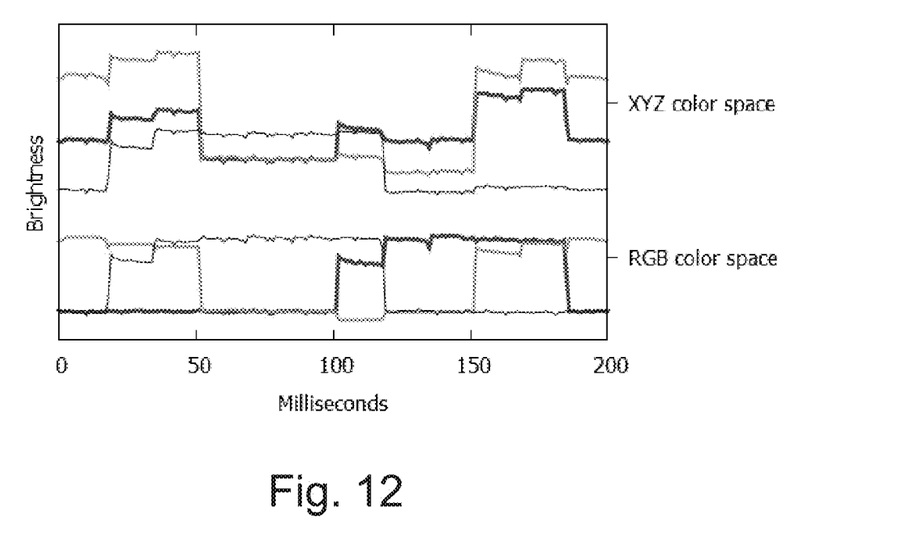
FIG. 12 depicts an example of conversion between XYZ to RGB colour space.

The result of colour calibration is the conversion from XYZ colour space to the RGB colour space. FIG. 12 shows an example of this.

One way to obtain the base vectors would be to separately measure a red, a green and a blue screen. However, this is cumbersome and would require a separate calibration video for the purpose. Instead, it is possible to collect colour information of a number of colour transitions (e.g. about 20 colour transitions) so that each of the red, green and blue colours occurs at least once. Then, those colours should be recognized among the other colours. This can be accomplished if all the colours are known to be fully saturated, i.e. all RGB channels are either fully off or fully on. In an ideal case, the colour components of the samples projected to RGB space would each have a value of either 0 or 255. Therefore, a score for a particular configuration can be computed by summing the squared differences from these two values. To find the best configuration, all the samples can be gone through, trying each candidate for each of the base vectors and select the best score.

Once the base vectors are known, a transformation between the XYZ and RGB colour spaces can be built. If it is assumed that the black on the screen is almost truly black (zero values) for the sensor also, a simple 3×3 matrix can be used as a linear transformation:

$$\begin{bmatrix} x \\ y \\ z \end{bmatrix} = \begin{bmatrix} R_x & G_x & B_x \\ R_y & G_y & B_y \\ R_z & G_z & B_z \end{bmatrix} \begin{bmatrix} r \\ g \\ b \end{bmatrix} \quad (1)$$

Here the R, G and B columns are the base vectors, r, g, b are the values in RGB colour space and x, y, z are the values in XYZ colour space. By inverting the matrix, transformation from XYZ colour space to RGB can be obtained.

Next, some principles for designing the sequence of colours for the identifier are provided to maximize the robustness and performance of the measurement. To measure accurate frame times, the changes between frames should be clearly recognizable. Therefore, consecutive colours should have a maximal difference in at least one colour component.

Even with colour calibration, the RGB mapping of the colours is not perfect. Especially colours that are not fully saturated (value of some channels is e.g. 128 instead of 0 or 255) are harder to recognize. Therefore, in some embodiments the sequence may use only fully saturated colours.

When more than one colour channel changes value at once, the changes may not happen at the same speed. These effect may be possible to be filtered out. Nevertheless, to improve robustness the ideal sequence should have changes in only one colour channel at a time.

Figure 13:
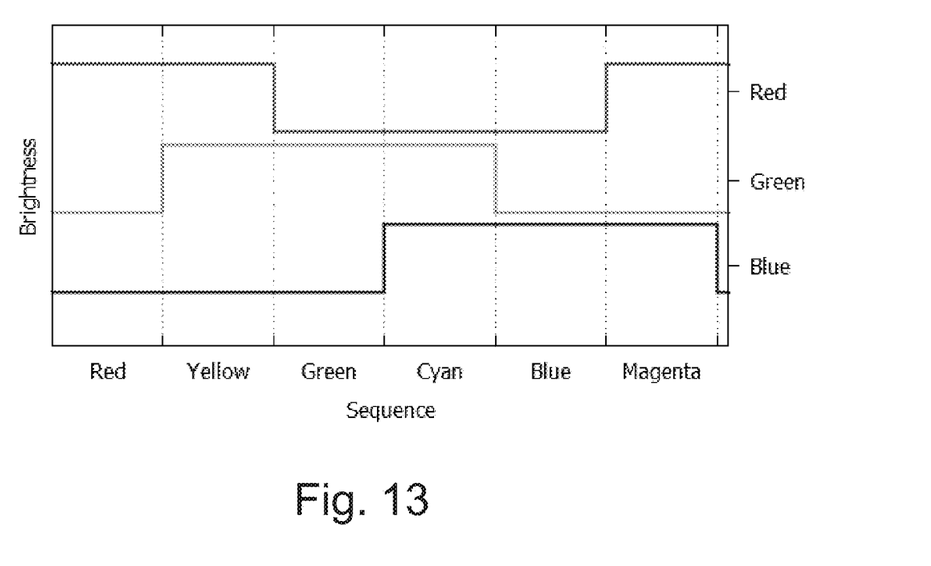
FIG. 13 depicts an example of a colour sequence used as an identifier according to an example embodiment of the present invention.

Given these requirements, an example sequence obtained this way is shown in FIG. 13. This is a length 6 sequence consisting from only the fully saturated colours, with exactly one colour channel switching at each frame boundary.

In some embodiments testing of the display 1 may be performed as follows. A previously made test videos including the identifier in each frame or generated videos and generated identifiers for each frame may be used and sent to the display 1. The sensor 3 is placed in front of the blinking marker on the display 1. The frame intervals may be shown by e.g. a display 2.3 of the apparatus 2 in a running graph, and statistics may be made visible as e.g. numbers. The results can be saved e.g. into a file for further analysis.

In practical implementations at least part of the above described operations may be performed by a processor 2.2 or by some other kind of programmable device. Therefore, a memory 2.4 of the apparatus 2 may include computer code when executed by the processor 2.2 cause the apparatus to perform the steps of the method of the present invention. Hence, the filter 2.21, an analyser 2.22 and/or some other operational block may be implemented as the computer code and/or by using specific electronic components.

It should also be noted here that although the above disclosure has used a sequence of different colours the present invention can also be used by using a sequence of different grey scales. Hence, it may also be possible to test monochrome displays (e.g. black and white displays) as well.

In the following some examples will be provided.

According to a first example there is provided a method for testing a display comprising:
    capturing information displayed by the display at a location of an identifier displayed with a frame of a sequence of frames; and
    analysing the captured information;
characterised in that the method further comprises:
    determining a colour of the identifier; and
    using information on the determined colour to determine at least one of the following:
        a change of a frame in the sequence of frames displayed by the display;
        a timestamp of a frame in the sequence of frames displayed by the display;
        a frame of the sequence of frames not displayed by the display;
    wherein the analysing the captured information comprises:
        detecting changes of illumination level of the identifier;
        determining a backlight illumination periods on the basis of changes in the illumination level; and
        providing timing information for the determining of the colour of the identifier.

In some embodiments of the method the colour of the identifier of each three successive frames of the sequence of frames differs from each other.

In some embodiments of the method at least three different colours are used for the identifiers; wherein the at least three different colours form a sequence of colours which is repeated in the sequence of frames.

In some embodiments the method comprises comparing the determined colours of identifiers with the sequence of colours to determine if one or more frames of the sequence of frames were not displayed by the display.

In some embodiments of the method the sequence of frames is provided to the display for displaying, wherein each frame includes the identifier in the same location.

In some embodiments of the method the sequence of frames is provided to the display for displaying, and the identifier is generated for each frame and provided to the display.

In some embodiments of the method the capturing information comprises taking samples of a signal formed by a sensor on the basis of the displayed identifier.

In some embodiments of the method the timing information is used to determine which samples to use to determine the colour of the identifier.

In some embodiments the method comprises comparing the determined colours of two successive identifiers to determine if the colours are different; and if so, determining the change of frame.

According to a second example there is provided an apparatus for testing a display comprising:
 a sensor for capturing information displayed by the display at a location where an identifier is shown for each frame of a sequence of frames; and
 an analyser for analysing the captured information;
characterised in that the analyser comprises:
 means for determining a colour of the identifier; and
 means for using information on the determined colour to determine at least one of the following:
 a change of a frame in the sequence of frames displayed by the display;
 a timestamp of a frame in the sequence of frames displayed by the display;
 a frame of the sequence of frames not displayed by the display;
wherein the apparatus the analyser comprises:
 means for detecting changes of illumination level of the identifier;
 means for determining a backlight illumination periods on the basis of changes in the illumination level; and
 means for providing timing information for the determining of the colour of the identifier.

In some embodiments of the apparatus the colour of the identifier of each three successive frames of the sequence of frames differs from each other; and that at least three different colours are used for the identifiers; wherein the at least three different colours form a sequence of colours which is repeated in the sequence of frames, wherein the analyser is adapted to compare the determined colours of identifiers with the sequence of colours to determine if one or more frames of the sequence of frames were not displayed by the display.

In some embodiments the apparatus comprises means for providing the identifier for each frame to the display.

In some embodiments the apparatus comprises means for taking samples of a signal formed by the sensor on the basis of the displayed identifier.

In some embodiments the apparatus comprises means for using the timing information to determine which samples to use to determine the colour of the identifier.

In some embodiments the apparatus comprises means for comparing the determined colours of two successive identifiers to determine if the colours are different; and if so, determining the change of frame.

According to a third example there is provided a computer program product for testing a display including one or more sequences of one or more instructions which, when executed by one or more processors, cause an apparatus or a system to at least perform the following:
 capture information displayed by the display at a location of an identifier displayed with a frame of a sequence of frames; and
 analyse the captured information;
characterised in that said at least one memory stored with code thereon, which when executed by said at least one processor, further causes the apparatus or system at least to perform:
 determine a colour of the identifier; and
 use information on the determined colour to determine at least one of the following:
 a change of a frame in the sequence of frames displayed by the display;
 a timestamp of a frame in the sequence of frames displayed by the display;
 a frame of the sequence of frames not displayed by the display;
wherein said at least one memory is stored with code thereon, which when executed by said at least one processor, further causes the apparatus or system at least to perform:
 detect changes of illumination level of the identifier;
 determine a backlight illumination periods on the basis of changes in the illumination level; and
 provide timing information for the determining of the colour of the identifier.

In some embodiments of the computer program product the colour of the identifier of each three successive frames of the sequence of frames differs from each other; and that at least three different colours are used for the identifiers; wherein the at least three different colours form a sequence of colours which is repeated in the sequence of frames, wherein said at least one memory stored with code thereon, which when executed by said at least one processor, further causes the apparatus or system to compare the determined colours of identifiers with the sequence of colours to determine if one or more frames of the sequence of frames were not displayed by the display.

In some embodiments of the computer program product said at least one memory stored with code thereon, which when executed by said at least one processor, further causes the apparatus or system at least to take samples of a signal formed by a sensor on the basis of the displayed identifier.

In some embodiments of the computer program product said at least one memory stored with code thereon, which when executed by said at least one processor, further causes the apparatus or system at least to use the timing information to determine which samples to use to determine the colour of the identifier.

In some embodiments of the computer program product said at least one memory stored with code thereon, which when executed by said at least one processor, further causes the apparatus or system at least to compare the determined colours of two successive identifiers to determine if the colours are different; and if so, determining the change of frame.

The present invention is not limited to the above described embodiments but can be modified within the scope of the appended claims.

The invention claimed is:
1. A method for testing a display comprising:
 using a sensor to capture information displayed by the display at a location of an identifier displayed with a frame of a sequence of frames, in which the colour of the identifier of at least each three frames of the sequence of frames differs from each other;
 using an analyser to analyse the captured information;
 using a colour transition detector to detect a colour of the identifier;

using a frame change detector to determine a change of a frame in the sequence of frames displayed by the display from information on the detected color; and
using the frame change detector to further determine at least one of the following from the determined change of frame:
  a timestamp of a frame in the sequence of frames displayed by the display;
  a frame of the sequence of frames not displayed by the display;
wherein analysing the captured information comprises:
  detecting, using the frame change detector, changes of illumination level of the identifier;
  determining, using the frame change detector, a backlight illumination period on the basis of changes in the illumination level; and
using, by a sampler, the determined backlight illumination periods for obtaining samples synchronized with the determined backlight illumination period for determining the colour of the identifier.

2. The method according to claim 1, wherein the colour of the identifier of each three successive frames of the sequence of frames differs from each other.

3. The method according to claim 2, wherein at least three different colours are used for the identifiers; wherein the at least three different colours form a sequence of colours which is repeated in the sequence of frames.

4. The method according to claim 3 further comprising comparing the determined colours of identifiers with the sequence of colours to determine if one or more frames of the sequence of frames were not displayed by the display.

5. The method according to claim 1 comprising providing the sequence of frames to the display for displaying, wherein each frame includes the identifier in the same location.

6. The method according to claim 1 comprising providing the sequence of frames to the display for displaying, generating the identifier for each frame, and providing the identifier to the display.

7. The method according to claim 1, wherein capturing the information comprises taking samples of a signal formed by a sensor on the basis of the displayed identifier.

8. The method according to claim 1 comprising using the timing information to determine which samples to use to determine the colour of the identifier.

9. The method according to claim 1, comprising comparing the determined colours of two successive identifiers to determine if the colours are different; and if so, determining the change of frame.

10. An apparatus for testing a display comprising:
a sensor for capturing information displayed by the display at a location where an identifier is shown for each frame of a sequence of frames, in which the colour of the identifier of at least each three frames of the sequence of frames differs from each other; and
an analyser for analysing the captured information;
a colour transition detector for determining a colour of the identifier; and
a frame change detector for using information on the determined colour to determine a change of a frame in the sequence of frames displayed by the display and for using the determined change of frame to further determine at least one of the following:
  a timestamp of a frame in the sequence of frames displayed by the display;
  a frame of the sequence of frames not displayed by the display;
wherein the analyser comprises:
  means for detecting changes of illumination level of the identifier;
  means for determining a backlight illumination period on the basis of changes in the illumination level; and
  a sampler for using the determined backlight illumination periods for obtaining samples synchronized with the determined backlight illumination period for determining the colour of the identifier.

11. The apparatus according to claim 10, wherein the colour of the identifier of each three successive frames of the sequence of frames differs from each other; and that at least three different colours are used for the identifiers; wherein the at least three different colours form a sequence of colours which is repeated in the sequence of frames, wherein the analyser is adapted to compare the determined colours of identifiers with the sequence of colours to determine if one or more frames of the sequence of frames were not displayed by the display.

12. The apparatus according to claim 10, wherein the apparatus comprises means for providing the identifier for each frame to the display.

13. The apparatus according to claim 10, wherein the apparatus comprises means for taking samples of a signal formed by the sensor on the basis of the displayed identifier.

14. The apparatus according to claim 10, wherein the apparatus comprises means for using the timing information to determine which samples to use to determine the colour of the identifier.

15. The apparatus according to claim 10, wherein the apparatus comprises means for comparing the determined colours of two successive identifiers to determine if the colours are different; and if so, determining the change of frame.

16. A computer program product for testing a display including one or more sequences of one or more instructions stored in a memory which, when executed by one or more processors, cause an apparatus or a system to at least perform the following:
use a sensor to capture information displayed by the display at a location of an identifier displayed with a frame of a sequence of frames, in which the colour of the identifier of at least each three frames of the sequence of frames differs from each other;
use an analyser to analyse the captured information;
use a colour transition detector to determine a colour of the indentifier;
use a frame change detector to determine a change of a frame in the sequence of frames displayed by the display from information on the determined colour;
use the determined change of frame to further determine at least one of the following:
  a timestamp of a frame in the sequence of frames displayed by the display;
  a frame of the sequence of frames not displayed by the display;
detect changes of illumination level of the identifier;
determine a backlight illumination period on the basis of changes in the illumination level; and
use a sampler to obtain samples synchronized with the determined backlight illumination period for determining the colour of the identifier, using the determined backlight illumination period.

17. The computer program product according to claim 16, wherein the colour of the identifier of each three successive frames of the sequence of frames differs from each other; and that at least three different colours are used for the identifiers; wherein the at least three different colours form a sequence of colours which is repeated in the sequence of frames, wherein said one or more sequences of one or more instructions stored in a memory, when executed by said at least one processor, further causes the apparatus or system to compare the determined colours of identifiers with the sequence of colours to determine if one or more frames of the sequence of frames were not displayed by the display.

18. The computer program product according to claim 16, wherein said one or more sequences of one or more instructions stored in a memory, when executed by said at least one processor, further causes the apparatus or system at least to take samples of a signal formed by a sensor on the basis of the displayed identifier.

19. The computer program product according to claim 16, wherein said one or more sequences of one or more instructions stored in a memory, when executed by said at least one processor, further causes the apparatus or system at least to use the timing information to determine which samples to use to determine the colour of the identifier.

20. The computer program product according to claim 16, wherein said one or more sequences of one or more instructions stored in a memory, when executed by said at least one processor, further causes the apparatus or system at least to compare the determined colours of two successive identifiers to determine if the colours are different; and if so, determining the change of frame.

* * * * *